L. S. MOORE.
ANIMAL TRAP.
APPLICATION FILED SEPT. 13, 1915.
1,202,564. Patented Oct. 24, 1916.
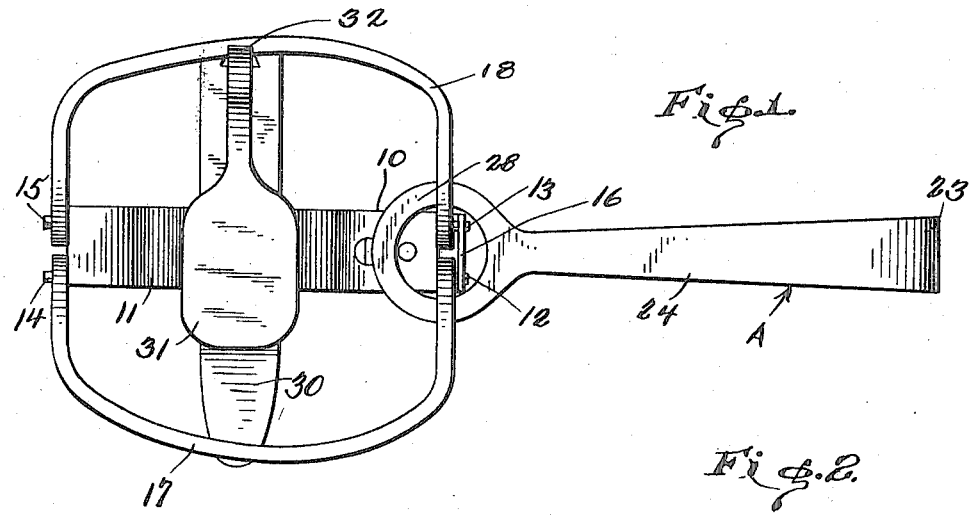
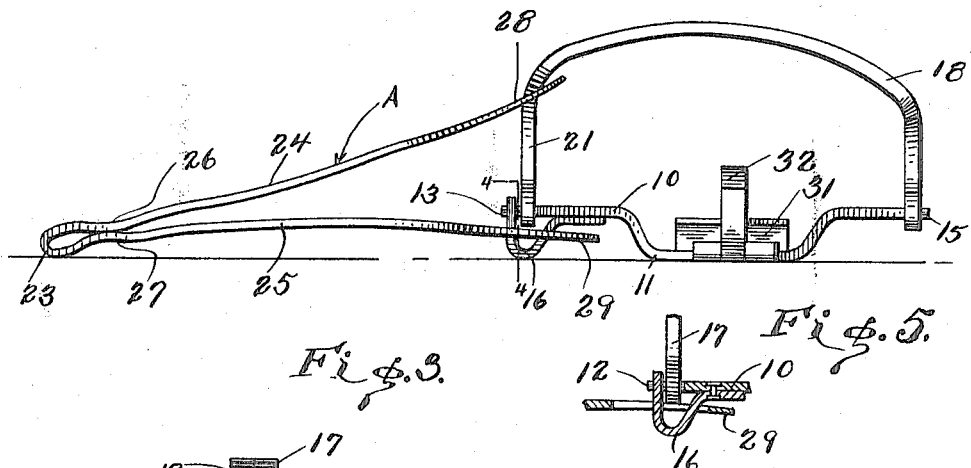
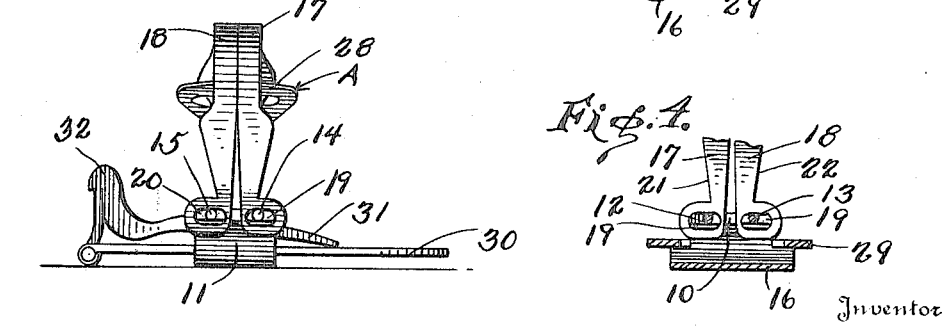
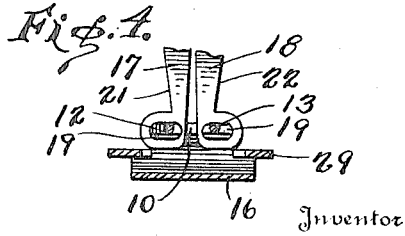
Witnesses
H. F. Costello
Henry T. Bright
Inventor
L. S. MOORE
By
Attorneys

UNITED STATES PATENT OFFICE.

LEWIS S. MOORE, OF MOUNT VERNON, OREGON.

ANIMAL-TRAP.

1,202,564.      Specification of Letters Patent.     Patented Oct. 24, 1916.

Application filed September 13, 1915. Serial No. 50,454.

*To all whom it may concern:*

Be it known that I, LEWIS S. MOORE, a citizen of the United States, residing at Mount Vernon, in the county of Grant, State of Oregon, have invented certain new and useful Improvements in Animal-Traps; and I do hereby declare the following to be a full, clear, and exact description of the invention, such as will enable others skilled in the art to which it appertains to make and use the same.

This invention relates to animal traps.

The object of the invention is to provide an animal trap embodying an improved construction designed to materially increase the efficiency of and simplify traps of this type.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of an animal trap constructed in accordance with the invention and with the parts in set position; Fig. 2, a side view of the trap with the parts in unset position; Fig. 3, an end view of the trap; Fig. 4, a section on the line 4—4 of Fig. 2, and Fig. 5, a partial longitudinal section of the trap.

Referring to the drawings the improved trap is shown as comprising a base 10 having a central U-shaped portion 11. One end of the base 10 is provided with pivot arms 12 and 13, while the other end of the base is provided with pivot arms 14 and 15. Secured to the end of the base 10 adjacent the arms 12 and 13 is a U-shaped clip 16 through which the arms 12 and 13 are engaged. The trap further comprises coöperating U-shaped jaws 17 and 18. The ends of the jaw 17 are provided respectively with elongated openings 19 through which are engaged the arms 12 and 14, while the ends of the jaw 18 are provided respectively with elongated openings 20 through which are engaged the arms 13 and 15. In this manner the jaws 17 and 18 are pivotally mounted on the base 10 for movement from the position shown in Fig. 1 to the position shown in Fig. 2. These jaws 17 and 18 are further provided with cam edges 21 and 22 respectively for a purpose that will presently appear.

In order to normally hold the jaws in the position shown in Fig. 2 there is employed a spring A of the leaf type and bent upon itself at 23 to form arms 24 and 25. These arms 24 and 25 at a point slightly spaced from the bend 23 are again bent at 26 and 27 respectively so as to bring the arms into engagement at that point. The free ends of the arms 24 and 25 terminate respectively in eye portions 28 and 29 the former of which is engaged over the jaws 17 and 18 while the latter extends beneath the base 10 and is engaged around the clip 16 which latter forms a seat therefor. Secured to the U-shaped portion 11 of the base 10 is a plate 30 to which is pivoted a trigger 31 having formed integral therewith a sear 32.

In setting the trap the arm 24 of the spring is forced toward the arm 25 to permit the jaws 17 and 18 to move to the position shown in Fig. 1 when the jaw 18 is engaged with the sear 32, the jaws 17 and 18 are then held against movement to the position shown in Fig. 2 under the influence of the spring A, which influence is exerted through the wall of the eye 28 coöperating with the cam edges 21 and 22. When the weight of the animal is disposed upon the trigger 31 the sear 32 will be disengaged from the jaw 18 and the latter will be released to the influence of the spring with the result that the jaws 17 and 18 will move to the position shown in Fig. 2.

By providing the bends 26 and 27 and bringing the arms 24 and 25 into engagement at that point said arms in the set position of the trap will come together throughout and thus render it easy to conceal the trap. By providing the jaws 17 and 18 with the elongated openings 19 and 20 a distinct advantage is gained in the case a stick or other obstruction should get between the jaws in that said openings will permit the upper portions of the jaws to come together and catch the animal even though the lower portions of said jaws are held apart by the obstruction.

The clip 16 possesses a distinct advantage in that it holds the jaws 17 and 18 in place and supports the pivot arms 12 and 13 as well as the arm 25 of the spring A.

It will be obvious that the size of the trap may be varied and in the case of very large traps the jaws 17 and 18 may be provided on their inner edges with projections forming teeth to increase their holding efficiency.

What is claimed is:

In an animal trap, the combination of a base, a pair of pivot arms projecting from each end of the base, a U-shaped clip secured to one end of the base and having the adjacent pivot arms engaged therethrough, U-shaped clamping jaws having their ends provided respectively with elongated openings through which are engaged respective pivot arms to pivotally connect the jaws to the base, releasable means for holding the jaws in set position and a leaf spring bent to form arms, one of which has its free end interlocked with the U-shaped clip and the other provided with an opening through which the clamping jaws are engaged and operating to close the clamping jaws when the latter are released.

In testimony whereof, I affix my signature, in the presence of two witnesses.

LEWIS S. MOORE.

Witnesses:
LEWIS M. HALL,
FAY ROBERTS.

Copies of this patent may be obtained for five cents each, by addressing the "Commissioner of Patents, Washington, D. C."